United States Patent [19]  [11]  4,298,623
Anderson et al.  [45]  Nov. 3, 1981

[54] METHOD OF PRESERVING FRESH CHERRIES

[76] Inventors: Lyle K. Anderson, P.O. Box 354, Warrenton, Oreg. 97146; Harold B. Allen, Rt. 2, Box 110, Astoria, Oreg. 97103

[21] Appl. No.: 103,429

[22] Filed: Dec. 14, 1979

[51] Int. Cl.³ .......................... A23B 7/08; A23B 7/10
[52] U.S. Cl. .................................. 426/335; 426/419; 426/639; 426/654
[58] Field of Search ............ 426/286, 321, 335, 61–65, 426/639, 640, 654, 419

[56] References Cited

U.S. PATENT DOCUMENTS

| | | | |
|---|---|---|---|
| 169,591 | 11/1875 | Sacc | 426/321 X |
| 1,009,325 | 11/1911 | Lodge | 426/335 |
| 1,507,328 | 9/1924 | Babigian et al. | 426/321 |
| 2,340,145 | 1/1944 | Rogers | 426/321 X |
| 2,785,071 | 3/1957 | Mathews | 426/639 |
| 2,801,925 | 8/1951 | Fisher | 426/321 |
| 3,365,309 | 1/1968 | Pader et al. | 426/639 |

*Primary Examiner*—Arthur L. Corbin
*Attorney, Agent, or Firm*—Hartwell & Dickinson Kolisch

[57] ABSTRACT

A method of processing fresh cherries which renders them storable, whereby the cherries are immersed in an aqueous storage solution containing an edible bacteriostatic acid and dissolved sugar. Sweetened cherries may be produced by draining stored cherries of this storage solution, and reimmersing them in a syrup prepared by increasing the sugar concentration of the storage solution.

10 Claims, No Drawings

METHOD OF PRESERVING FRESH CHERRIES

This invention relates to the processing of cherries, and more particularly to a method of processing fresh uncooked cherries in such a manner as to render the cherries storable. The invention further concerns a method of processing cherries which have been stored in the manner contemplated herein, to produce cherries of heightened sugar content, usable as garnish cherries, and in foods such as ice cream and yogurt, which require a relatively sweetened cherry to avoid undesirable hardness characterizing an unsugared cherry in hard frozen ice cream.

Common methods currently used for storing cherries in volume for off-season production of garnish cherries involve the use of cold storage, and in another method immersion in a brine prepared from sulfur dioxide and water. The latter procedure is widely used in the manufacture of the so-called maraschino cherry. There are attendant disadvantages in each of these procedures. Cherries stored by cold storage tend to rupture, with drippage occurring from ruptured cherry cells and loss of fruit sugars. Expenses involved in cold storage techniques tend to be considerable. Freezing of a cherry dramatically changes its texture. In connection with processing involving sulphur dioxide, or derivatives such as sulfurous acid and sulfite salts, such materials are considered dangerous to the consumers health. In the usual manufacture of a maraschino cherry, the color and natural flavor of the cherry is lost, requiring that dyes be employed to recolor the cherry, and the flavor of course is irreplaceable.

An object of this invention, therefore, is to provide a novel method of processing fresh uncooked cherries which renders the cherries storable for a long period of time, the process minimally affecting the color, flavor and texture of the cherries so that after storage they closely resemble the original fresh fruit.

Another object is the provision of a novel method of preparing a sweetened cherry, such as a garnish cherry.

A further object is to provide a novel cherry product produceable by the methods contemplated by the invention.

Following the invention, the use of deleterious chemicals such as sulfur dioxide, or derivatives, such as sulfurous acid and sulfite salts, may be eliminated. The use of artificial dyes, such as are presently employed in the production of maraschino cherries may also be eliminated. Texture and flavor changes, such as are produced by known processing methods using cold storage, are also eliminated.

A more specific object of the invention is the provision of a method for processing cherries for storage purposes wherein the cherries are immersed in a dilute aqueous solution of an edible, bacteriostatic acid and sugar, with the presence of the sugar inhibiting osmotically produced changes in the cherry.

Yet another object is to provide a method for preparing a sugared cherry, such as a garnish cherry, wherein sugaring is initiated by a process which renders the cherries initially storable.

One of the products produceable by the invention is a cherry-colored, fruit-flavored liquid having an appealing taste and adapted for consumption.

Another object is to provide a method of storing cherries which has been found to deaccentuate blemish marks. Greater latitude, therefore, is permitted in sorting and grading of cherries which are processed by the invention.

These and other objects and advantages are attained by the invention, which is described hereinbelow in conjunction with certain specific examples, which are included for the purposes of further illustrating the invention.

The usual cherry, such as a Bing, which is sold on the market for consumption as a fresh cherry, contains substantial amounts of sugar (fructose). In producing a maraschino cherry, the cherries are stored in an aqueous solution of sulfur dioxide, which functions to extract this natural sugar, and this extracted sugar is discarded when the sulfite brine is discarded. Following the instant invention, the natural cherry sugar is retained to a large extent during the storage process within the cherry. The solution which is used to immerse the cherry for storage itself may be used as the base for the solution used to sweeten the cherry to produce a garnish cherry. Thus, color, sugar and any other ingredients that may have passed into the solution during storage, is reintroduced to the cherry during the sweetening process.

In general terms, storage of cherries as contemplated herein, is performed by immersing clean, fresh, uncooked cherries in a dilute, aqueous, bacteriostatic, edible acid solution, which also contains controlled amounts of dissolved sugar which inhibits shrinking, splitting and other disfigurement of the cherries by reason of osmotic conditions in the solution.

The acid which is present in the solution is what is termed an edible acid, in that such can be included in food products without harmful effects on health. Exemplifying such edible acids are citric and phosphoric acids. The acid is a bacteriostat, in that the acid inhibits bacterial growth on the immersed cherries. As a general rule, it has been noted that inhibition of bacterial growth occurs at pH levels below about 4.5, and preferably, according to this invention, the pH of the immersing or storage solution is below about 3.5. In general terms, and considering a solution made up of 100 parts water (parts herein refer to parts by weight), up to about 3 parts acid may be included without imparting to the cherries, which have been immersed in the solution, an unpleasantly acidic taste, and there being sufficient acid present to inhibit bacterial growth.

It will be understood that the pH of an unbuffered solution is subject to change over a period of time. By way of example, a storage solution containing 100 parts water and 2.66 parts commercial food grade, white, 75 percent orthophosphoric acid, after preparation exhibited a pH of 1.4. After a year of immersion in this storage solution of pitted Bing cherries, the pH of the solution rose to 3.

The presence of the acid in the storage solution has the additional effect of acting as a color stabilizer.

Cherries contain solutes in their juice and this creates an osmotic pressure acting against the cherry skins and tissue interfaces. In order to maintain cherry texture and minimize splitting, swelling, shriveling and other cherry disfigurement, this osmotic pressure should be counterbalanced by a solute in the storage liquid. This invention contemplates as such a solute, the use of sugar in the storage liquid, which sugar in addition imparts a desirable sweetness to the cherries, to a degree masking the acidic taste introduced by the bacteriostat.

The sugar content of a ripe sweet cherry, such as a Bing, normally will average between about 22 and 26 percent. It is not required that this sugar content be exactly found in the storage liquid as this would require careful grading of individual cherries. Generally speaking, in treating cherries as a class, such as Bings, Lamberts, etc., satisfactory storage solutions were prepared by including with 100 parts water, 25 to 45 parts sugar (sucrose), to produce a concentration of sugar ranging from 20 to 31 percent. Preferably, the amount of sugar added to 100 parts water is within the range of 30 to 40 parts.

The storage solution in addition to acid and solute sugar may further contain trace amounts of an antifungous agent, such as sodium benzoate or sorbic acid. Usually no more than about 0.3 parts of such material for 100 parts water would be added. Although antifungous agents are not always necessary, yeasts and molds are capable of growth at the pH levels used. Further, there are a few genera of bacteria that can multiply in some media of this acidity.

If the cherries being stored are intended to be converted to garnish cherries, where it is desirable to have additional firmness in the cherry, trace amounts of a calcium salt, such as dicalcium phosphate may be included. Such a material is recognized in the art as producing firmness or hardness to the cherry product. Ordinarily no more than amount 0.03 parts of the calcium salt would be added to a solution having 100 parts water. The calcium salts of sorbic and benzoic acids have low solubility and that property must be born in mind when the solution is later concentrated.

To minimize the amount of storage solution required to immerse a batch of cherries, extraneous matters such as leaves are removed from the cherries during the cleaning process. If desired, the volume of the cherries may further be reduced by stemming and pitting the cherries before immersion, this having the result of increasing the amount of cherry fruit which is treatable with a given quantity of storage solution.

An important part of one feature of the present invention is that cherries processed for storage as outlined may then be further processed to convert them into a sweetened cherry, such as a garnish cherry, utilizing in this treatment the solution used in the storage process. Cherries that have been stored are sweetened to some extent by the sugar in the storage solution. Further sweetening of the cherry is accomplished by immersion of the cherry in the same storage solution changed to the extent that its sugar content is upwardly adjusted. Sweetening is done in such a manner as not to unduly stress the cherry, and since the original storage solution is used, the color and natural sweeteners in such solution are reintroduced, in effect, to the cherry being converted to the garnish type cherry.

Further explaining the production of a sweetened cherry, cherries that have been stored in a storage solution as outlined may be drained of the storage solution. Small amounts of calcium hydroxide to reduce the acidity of the solution may be added. Sugar (sucrose) may be added to bring the sugar concentration of the solution up to 35 percent. The cherries are then reimmersed in this solution for a day. After draining, and by evaporation of water, the sugar concentration is then raised by 3 percent and the cherries reimmersed. This process is repeated until the juice of the cherries being processed reaches 46 degrees Brix, normally achieved after the sugar concentration of the solution has been raised to within the range of 42 to 46 percent. By reason of the slow increase in sugar concentration, the pulps and skins of the cherries undergo minimal shriveling or shrinking. Color, flavor and texture of the cherries is retained.

The following examples serve further to illustrate the invention.

EXAMPLE 1

A storage solution was prepared by mixing the following:

| | |
|---|---|
| Water | 100 parts |
| Cane sugar | 33.3 parts |
| 75% food grade ortho-phosphoric acid | 2.67 parts |
| Sodium benzoate | 0.21 parts |
| U.S.P. Dicalcium phosphate (2 molecules attached water) | 0.021 parts |

Orchard run fresh Bing cherries were culled, stemmed, pitted, and half-sliced. Two hundred pounds of a storage solution prepared as above was sufficient to cover 250 pounds of the half-sliced cherries with the cherries deposited in a suitable vessel. After four months of storage at ambient exterior temperatures (above freezing), the cherries were unspoiled. Skin appearance, color, flavor and texture were good.

Unpitted cherries with stems, were immersed in the same storage solution. In this instance, however, twice as much storage solution was required to cover the cherries by reason of the larger volume taken up by the whole cherries and the attached stems. As in the first run described, after four months of storage, the cherries were unspoiled with good flavor, texture and color.

EXAMPLE 2

A storage solution was prepared by mixing the following:

| | |
|---|---|
| Water | 100 parts |
| Cane sugar | 33.3 parts |
| 75% Orthophosphoric acid | 2 parts |
| Sodium benzoate | 0.1 part |

One hundred twenty pounds of unstemmed and unpitted Bing cherries in a fresh and cleaned condition were placed in a vessel and covered by introducing into the vessel approximately 200 pounds of the storage solution. After four months of storage, at ambient exterior temperatures, the storage solution was drained from the cherries and the cherries were then stemmed and pitted. The storage solution had a pH of about 1.5 initially and rose to pH 2.2 after a month of storage.

The acidity of the storage solution was then reduced, to a pH 3.5, by the addition of powdered calcium hydroxide in small increments adding such slowly and with agitation of the liquid. Cane sugar was then added to the solution to raise the percentage of sugar to 35%. The pitted cherries were then reimmersed in this solution for one day.

The solution was then drained from the cherries, and by the evaporation of water, the sugar concentration of the solution was raised to 38 percent. The cherries were then reimmersed in the syrup so produced for another day. This process was repeated for two additional days to raise the sugar concentration of the solution to 47 percent.

It was observed that after such processing the pulps and skins of the cherries had undergone substantially no shriveling or wrinkling, the treated cherries were colorful and had a flavor and texture similar to a fresh cherry. The additional sugar content of the cherries was sufficient to give them a pleasing sweetness rendering them suitable as a garnish cherry.

The syrup produced as above described had a dark cherry color and a distinctly fruity cherry flavor, rendering the syrup suitable for food use.

EXAMPLE 3

Other edible or food grade acids may be employed in the preparation of the storage solution. In another preparation, the storage solution was prepared by and mixing the following:

| Water | 100 parts |
|---|---|
| Cane sugar | 33 parts |
| Citric acid | 2 parts |

Cleaned fresh whole cherries were immersed in the solution prepared as above. After two weeks at room temperature, the cherries were unspoiled and had good skins. Their color, flavor and texture were good and it was not necessary to neutralize any of the acid in the storage solution for taste reasons.

EXAMPLE 4

In another preparation a storage solution was prepared as follows:

| Water | 100 parts |
|---|---|
| Cane sugar | 42.6 parts |
| 85% Phosphoric acid | 1.3 parts |
| Sodium benzoate | 0.2 parts |

One hundred eighty pounds of fresh, pitted and sliced Lambert cherries were placed in a vessel and covered with one hundred forty-three pounds of the storage solution prepared above. After a month of storage at ambient temperature, the cherries were processed as in Example 2, save that neutralization with lime was eliminated. The sugar concentration of the final syrup produced was 45 percent. The sweetened cherries produced were similar to fresh cherries with respect to color, flavor and texture.

In the above set forth examples, it will be noted that the concentration of sodium benzoate and acid in the storage solution is low enough so that the storage solution may be concentrated to produce the syrup of adequate sweetness without exceeding benzoate tolerance limits.

While various embodiments of the invention have been described together with certain specific examples intended for purposes of illustration only, it should be understood that variations and modifications are possible without departing from the invention.

It is claimed and desired to secure by Letters Patent:

1. A method of processing cherries which comprises collecting cherries in a fresh, uncooked condition, and immersing said fresh, uncooked cherries for storage purposes, without pretreatment with sulfur dioxide or derivatives thereof, in an aqueous storage solution made up of an edible acid and dissolved sugar, the acid in said solution having sufficient concentration to inhibit bacterial growth and the sugar solute in the solution inhibiting osmotically produced change in cherry appearance.

2. The method of claim 1 wherein the edible acid produces a pH value of less than 4.0 and is selected from the group consisting of citric and phosphoric acid.

3. The method of claim 1 wherein said storage solution comprises from about 20 to 31 percent sugar solute.

4. The method of claim 1 wherein an antifungous agent is also included in the storage solution.

5. The method of claim 1, wherein said cherries, after immersion in said storage solution, are immersed in another solution prepared from the storage solution by increasing the concentration of sugar in said storage solution.

6. The method of claim 5, wherein said other solution is prepared with the further inclusion of an acid neutralizer which reduces the acidity of the storage solution.

7. A method of processing cherries which comprises storing fresh, uncooked cherries, which have not been treated with sulfur dioxide or derivatives thereof, by immersing them in an aqueous storage solution containing an edible bacteriostatic acid having sufficient concentration to inhibit bacterial growth and sugar effective to inhibit osmotically produced change in cherry, appearance and after storage of the cherries increasing their sugar concentration by immersing them in another solution, derived from said storage solution, prepared by increasing the concentration of sugar in said storage solution.

8. The method of claim 7 wherein the immersion in said other solution is done with periodic increase in the sugar concentration of said other solution.

9. The method of claim 7 wherein the sugar concentration in said other solution is increased periodically through the evaporation of water.

10. Cherries processed by the method of claim 7.

* * * * *